Aug. 11, 1953

H. W. PRICE ET AL 2,648,311

VALVE MECHANISM

Original Filed April 8, 1947

INVENTORS

BY H. O. Clayton

ATTORNEY

Aug. 11, 1953     H. W. PRICE ET AL     2,648,311
VALVE MECHANISM

Original Filed April 8, 1947

INVENTORS

BY H O Clayton

ATTORNEY

Patented Aug. 11, 1953

2,648,311

UNITED STATES PATENT OFFICE 2,648,311

VALVE MECHANISM

Harold W. Price, Pasadena, Calif., and Edward E. Hupp, South Bend, Ind., assignors to Bendix Aviation Corporation, South Bend, Ind., a corporation of Delaware Original application April 8, 1947, Serial No. 740,158. Divided and this application September 28, 1951, Serial No. 248,742

6 Claims. (Cl. 121—38)

This invention relates in general to valve mechanism and in particular to a power and manually operated three way valve mechanism adapted for use as a control means in a mechanism for controlling the operation of the friction clutch of an automotive vehicle.

It is an object of our invention to provide a compact and easily serviced valve unit adapted for use as a control means for a pressure differential operated motor, said unit including a power operated cut in three way valve and further including a three way valve actuated by power means and by means under the control of or actuated by a human being such as the driver of an automotive vehicle.

Another object of our invention is to provide means for operating and controlling the operation of a fluid pressure motor controlling a three way valve of the follow up type, said means including a manually controlled means comprising a three way valve operable, at the will of the operator, to cut the valve mechanism into operation that is make an operation of the follow up valve possible, and further including manually and power operated means for actuating the follow up valve.

Other objects of the invention will appear more fully hereinafter from the following detailed description when taken in connection with the accompanying drawings, wherein a single embodiment of the invention is illustrated.

Figure 3:
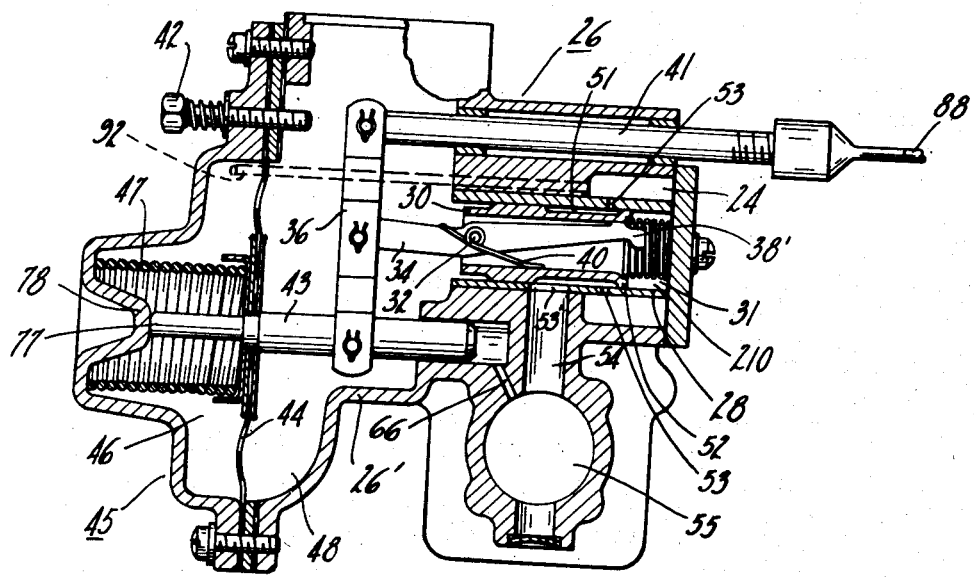
Figure 3 is a longitudinal sectional view taken on the line 3—3 of Figure 2 of the control valve mechanism of our invention.

The valve unit constituting our invention is disclosed in Figure 3 and said unit may be employed as a control means for the clutch control mechanism of an automotive vehicle; accordingly the remaining figures of the drawing disclose our invention as a part of such a control.

Describing now the clutch control mechanism disclosed in the several figures of the drawings, the principal elements thereof consist of a single acting vacuum motor 10 comprising a casing 12 and a power element such as a piston, not shown, which is connected to a friction clutch, not shown, of a conventional design. One end of the casing of the motor, a portion of the body thereof and the power element together outline a control chamber, the gaseous pressure within said chamber being controlled to control the operation of the motor. The force transmitting means interconnecting the power element of the motor with the clutch preferably includes a flexible cable 14 connected to a crank 16; and said crank is fixedly connected to a shaft 18 which is connected to the clutch. A foot operated clutch pedal 20, contactable with a flange 21 extending from the crank 16, is also preferably included in the clutch operating mechanism.

Figure 2:
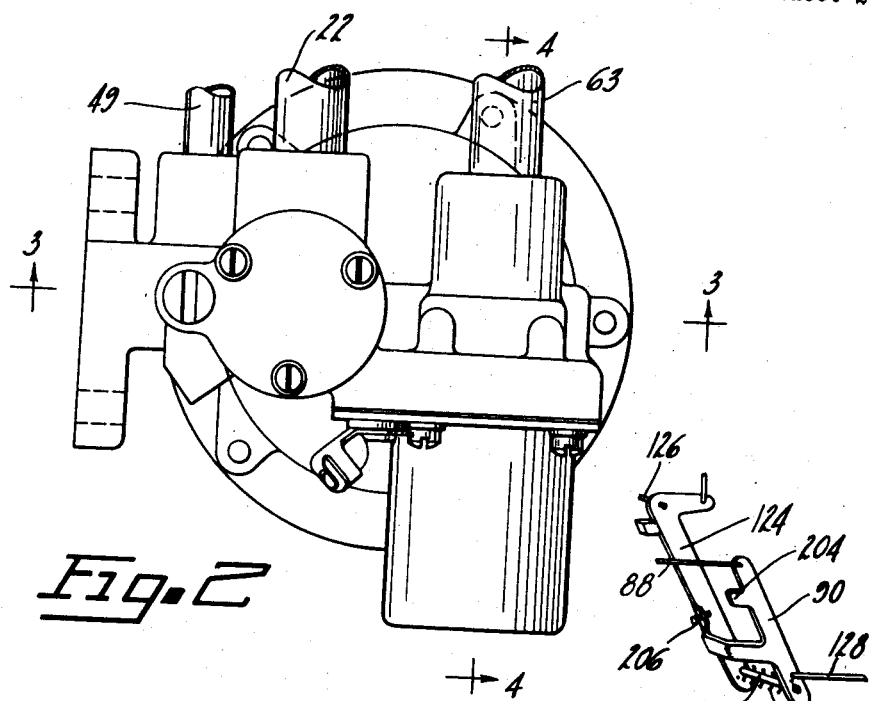
Figure 2 is a plan view looking at one end of the valve mechanism of our invention.
Figure 5:
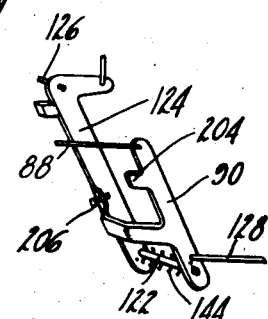
Figure 5 is a view disclosing the principal parts of the connection interconnecting the accelerator, the throttle and the control valve.
Figure 4:
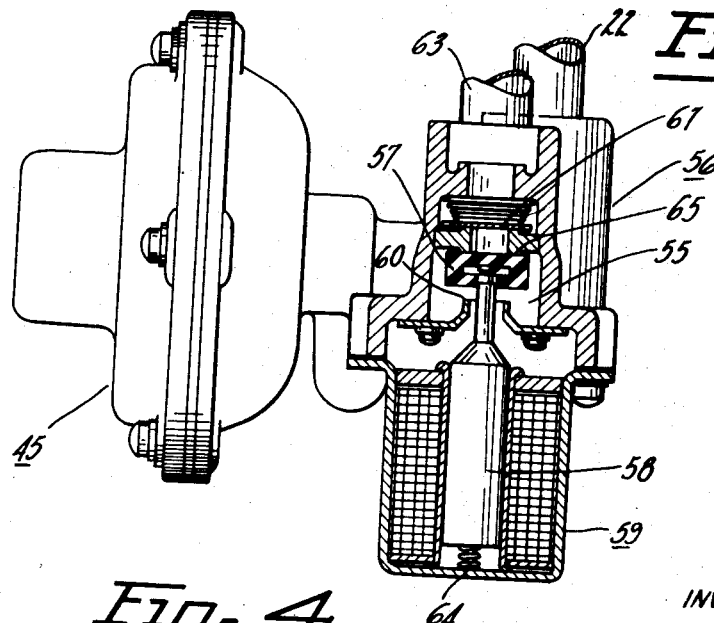
Figure 4 is a view, partly in section, taken on the line 4—4 of Figure 2 disclosing details of the solenoid operated vacuum cut in valve of the valve mechanism of our invention.

One end of the motor 10, that is the end of the same constituting a part of the aforementioned power compartment of the motor, is connected by a conduit 22 to a compartment 24 of a control valve unit indicated as a whole by the reference numeral 26 and three different views of said unit are disclosed in Figures 2 to 4 inclusive. The casing 26' of the unit 26 is provided with a cylindrically shaped bore to receive a cylindrical sleeve valve member 28 constituting one of the two parts of a three way valve; and said casing is counterbored to provide the aforementioned compartment 24, Figure 3.

A valve member 30, which is biased inwardly by a spring 31 and which is provided with a cylindrically shaped bore to permit the passage of air therethrough, constitutes the other part of the two part three way valve. One end of the latter valve member, is provided with diametrically spaced openings to receive therethrough a pin 32 and said pin extends through a connecting pin 34, one end of which extends within the member 30. The other end of the pin 34 extends beyond the valve member 30 and is detachably connected to a two-part lever 36. The end portion of the pin 34 is preferably biased into engagement with the interior of the valve 30 by a coil spring 40. There is thus provided means for readily disconnecting valve 30 from the lever 36; for the pin 32 may be removed by driving the same through the pin 34, thereby separating the latter from the valve 30.

As is disclosed in Figure 3, the lever 36 is pivotally connected at one of its ends to a rod 41; and the movement of the rod to the left, Figure 3, is limited by a stop pin 42 adjustably mounted in the valve casing. The other end of the lever 36 is pivotally connected to a pin 43 which is slidably received at one of its ends in a portion of the valve casing and which is secured at its other end to a flexible diaphragm 44. This diaphragm constitues the power element of a valve operating pressure differential operated motor indicated as a whole by the reference numeral 45; and the operation of said motor is in large measure controlled by the gaseous pressure within the control compartment 46 of said motor, and by a compression spring 47 within said motor compartment. A compartment 48 of the motor 45 is vented to the atmosphere via a conduit 49 which leads to an air cleaner 50, Figure 2.

The valve member 30 is recessed at 51 and the end of said member provides a land portion 52 which is adapted, in the operation of the valve, to be positioned to register the recess 51 with ports 53 in the valve member 28. The member 30 is also operated so that the land portion 52 covers the ports 53, that is, laps the valve and is also operated to interconnect said ports with the air cleaner 50 via the compartment 48 and the interior of the valve.

The valve member 28 is provided with an opening 53' to register with one end of a duct 54 in the valve casing, said duct registering at its other end with a chamber 55 of a three-way vacuum cut in valve indicated as a whole by the reference numeral 56 and disclosed in detail in Figure 4. The latter valve includes a valve member 57 secured to one end of an armature 58 of a solenoid 59. When the solenoid 59 is energized the valve member 57 moves downwardly, Figure 4, to seat at 60, thereby connecting the duct 54 with the intake manifold 61 of the internal combustion engine 62 of the vehicle via a conduit 63 and the aforementioned chamber 55; and when the solenoid 59 is deenergized, a spring 64 serves to move the armature upwardly, Figure 4, to seat the valve member 57 at 65, thereby cutting off the vacuum connection and venting the duct 54 to the atmosphere via the air cleaner 50, chamber 48 of the motor 45, the recess in the valve casing which houses the outer end of the pin 43, a duct 66 in the valve casing, and the chamber 55. A spring loaded check valve 67 may be included in the vacuum connection between the intake manifold and the valve chamber 55 thereby providing a means for maintaining the clutch disengaged in the event the conduit is broken when the motor 10 is energized.

Completing the description of the valve unit 26 the casing 26' is provided with a duct 82, Figure 3, permanently interconnecting the control compartment 46 of the motor 45 with the aforementioned valve compartment 24. There is thus provided fluid transmitting means for at all times interconnecting the motor compartment 46, the valve compartment 24, and the control compartment of the clutch operating motor 10. It follows therefore that the operation of the clutch control mechanism constituting our invention is controlled by controlling the gaseous pressure within the valve compartment 24.

There is thus provided, by our invention, a compact valve control unit 26 comprising a multi-sectional casing housing two three way control valves, and also housing means for operating said valves comprising a spring and pressure differential operated motor and an accelerator operated pin, said pin and the power element of the motor being connected with the movable part of said valve by means of a floating lever member. The follow up three way valve 30 is thus manually operated and power operated, and the three way cut in valve 56 is power operated, the latter operation being effected by the solenoid 59, Figure 4.

Describing now the force transmitting means interconnecting the accelerator 118 of the car with a throttle operating crank 120 and with the valve operating pin 41, said pin is connected to a rod 88 and this rod is pivotally connected with a lever member 90. The lower end of this lever member is pivotally mounted upon a floating pin 122 and one end of this pin is mounted in one end of a bell crank lever 124 which is pivotally mounted upon a fixed pin 126. The lever member 90 is connected to the accelerator 118 by means of a rod 128, a bell crank lever 130 and a link 132 all as disclosed in Figure 1; and as disclosed in the latter figure, the bell crank lever 124 is connected to the throttle valve of the carburetor by means of a link 134, a crank 136, a rod 138, a crank 140, a link 142 and the crank 120. A spring 144, which is weaker than a throttle return spring 145, is operative, together with the spring 145, to return the accelerator to its throttle closed position and to move the valve member 30 to the right, Figure 3, to open the three way valve, that is operate the same to effect a clutch disengaging operation of the motor 10. The spring 144 is preferably sleeved over the pin 122 and is connected at its ends to the levers 90 and 124. The operation of this part of the mechanism of my invention will be described in greater detail hereinafter when the operation of the entire clutch control mechanism is described in detail.

Figure 1:
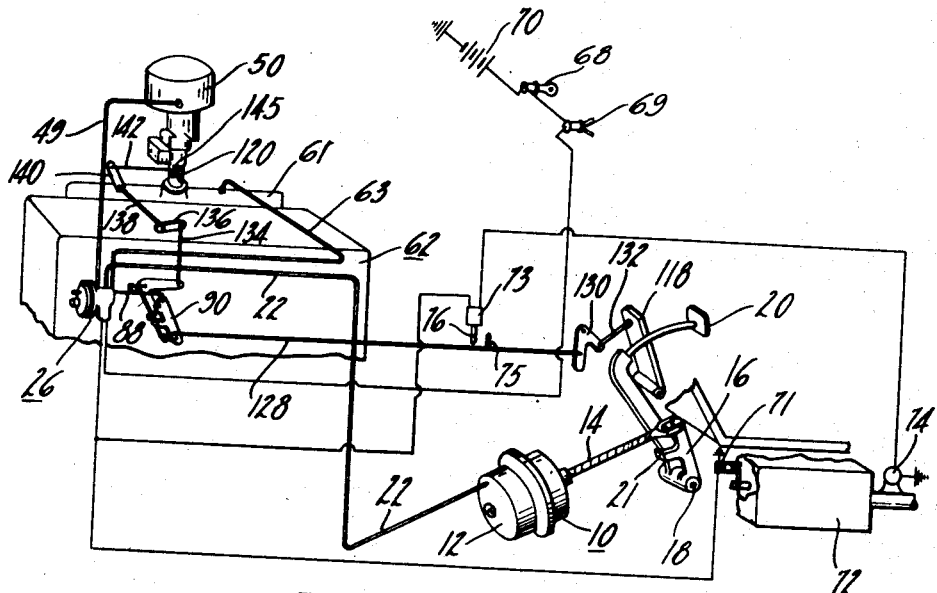
Figure 1 is a diagrammatic view disclosing the valve mechanism of our invention employed as part of a clutch control mechanism.

The solenoid 59 which operates the vacuum cut in valve 56, is controlled by the electrical controls disclosed in Figure 1. Describing this mechanism a grounded battery 70 is wired in series with an ignition switch 68, a clutch control cutout switch 69 preferably mounted in the instrument panel of the vehicle, the solenoid 59, and a grounded switch 71 which is opened by the second and high gear shift rail of the transmission 72 when the transmission is established in its high gear setting. With this electrical hookup the valve 56 is opened, that is, the valve member 57 is seated at 60, when the switches 68 and 69 are closed and the transmission is established in any gear except high gear; accordingly, with the vacuum cut in valve opened there is provided a source of vacuum to make possible a clutch disengaging operation of the motor 10 when the accelerator is released to open the valve 28, 30 an operation which is described in detail hereinafter.

With the vehicle traveling in high gear it is desirable to automatically disengage the clutch when the accelerator is released and the speed of the vehicle is appreciably reduced, for example when the vehicle is being driven very slowly in traffic; and to effect this operation of the mechanism of our invention there is provided a switch 73 which is closed when the accelerator is released to close the throttle, and a grounded switch 74 which is operated by a vehicle speed responsive governor, not shown. To effect the operation of the switch 73 there is provided a flange 75 on the rod 128, said flange being contactible with a switch operated member 76.

As is disclosed in Figure 1 the switches 74 and 73 are electrically connected in series in an electrical circuit which is wired in parallel with the grounded transmission operated switch 71. Preferably the switch 73 is so constructed and so operated by the flange 75 that the same is closed just prior to the complete closing of the throttle valve; and is follows, therefore, that the switch 73 is not opened until after the throttle has been opened to a limited degree.

Describing now the complete operation of the mechanism including our invention and incidentally completing the description of the parts thereof not heretofore described, when the accelerator 118 is released to close the throttle and idle the internal combustion engine 114, the intake manifold 112 of said engine is partially evacuated. There is thus provided a source of vacuum for energizing the motor 10 to disengage the friction clutch of the motor vehicle; and this operation is effected inasmuch as with the release of the accelerator the movable three way valve member 30 is moved to place said motor in air transmitting connection with the manifold. The valve member 30 and the means for operating the same then assume the relative positions disclosed in Figure 3, the end portion 77 of the pin abutting a stop 78 pressed in from the wall of the valve housing. Air is then withdrawn from the clutch motor and the motor compartment 46 into the intake manifold via the conduit 63, the valve compartment 55, the duct 54 interconnecting the compartment 55 with the port 53′, Figure 3, recess 51, ports 53, the compartment 24, the duct 92 interconnecting the compartment 24 with the valve motor compartment 46, and the conduit 22 interconnecting the compartment 24 with the control chamber of the clutch motor 10.

The compartment 46 being then partially evacuated the diaphragm 44 is moved, by the differential of pressures acting on the same, to the position disclosed in Figure 3; for the gaseous pressure within the compartment 46 is at this time the same as that within the intake manifold of the idling engine and this gaseous pressure is of course the same as that within the control compartment of the then energized clutch operating motor 10. It is to be noted that in this clutch disengaged position of the parts the valve member 30 is moved to the left, Figure 3, to a position just short of a closing off of the ports 53 by the flanged end of said valve member, that is, the land 52.

Now it is to be noted that the air transmitting connection with the intake manifold is made possible by virtue of the fact that the valve member 57 of the vacuum cut in valve unit 56 is at the time removed from a seat 65; for the solenoid 59 which actuates said valve member is at the time energized to move the armature 58 and the valve member 57 connected thereto downwardly, Figure 4. Explaining this operation the solenoid 59 is at this time energized by virtue of a closing of the grounded breaker switch 74; for inasmuch as the car is at a standstill the vehicle speed responsive governor, not shown, is then operative to close said switch. The governor is so constructed that when the vehicle is at a standstill or is traveling below a relatively low speed, say ten mils per hour, then the governor is operative to close the grounded switch 74 thus completing an electrical circuit including the switch 74, the then closed accelerator operated switch 73, the solenoid 59, the cutout switch 69, the ignition switch 68 of the vehicle and the grounded battery 70.

It is also to be noted at this juncture that when the valve operating motor 45 is energized the movement to the left, Figure 3, of the diaphragm 44 of said motor not only serves to move the valve member 30 to the position disclosed in said figure but also serves to compress the spring 47; and as will be described hereinafter the degree of compression of said spring, determined by the operation of the power element 44, constitutes a factor in the control of the valve to effect the stage operation of the clutch operating motor.

Continuing now the description of the cycle of clutch control operations of the motor 10, said motor having been energized to disengage the clutch the driver will then probably wish to establish the change speed transmission of the vehicle in a relatively low gear setting. This is, of course, done by moving the transmission controlling selector lever, not shown, to its low gear position.

Continuing now the description of the cycle of operations of the clutch control mechanism the power plant of the vehicle is now prepared to effect a forward movement of the vehicle accordingly the driver depresses the accelerator to open the throttle and effect a clutch engaging operation of the clutch operating power means. Describing the latter operation with the first increment of movement of the accelerator the lever 90 is rotated counterclockwise about the pin 122 as a fulcrum, this operation being made possible by virtue of the fact that the spring 144 is weaker than the throttle spring 145 and the latter spring is strong enough to prevent the rotation of the lever 124. In this operation the lever 90 moves counterclockwise until a flange 204 at the upper end of the same contacts an adjustable stop 206 on the lever 124; and this movement of the lever 90 results in a movement of the rod 88 to the left, Figure 3, to rotate the lever member 36 about its pivotal connection with the pin 43 as a fulcrum. The valve member 30 is thus moved to the left, Figure 3, the lever 36 operating as a lever of the second class to place the valve ports 53 in communication with a valve chamber 210 which chamber is at all times connected to the atmosphere via the interior of the valve member 30 and the valve compartment 48 which is at all times vented to the atmosphere via the air cleaner 50. It is to be noted that in this initial operation of the valve the degree of movement of the valve member 30 is greater, preferably about twice as great, as the degree of movement of the rod 128 connected to the accelerator. As will be brought out in the description that follows there is thus provided a valve operating mechanism operative to quickly effect the first stage operation of the motor 10 during the first increment of depression of the accelerator, said increment being relatively small.

The valve member 30 having been moved to the left to vent the valve compartment 24 to atmosphere there results a relatively rapid flow of air into both the control compartment of the clutch operating motor 10 and the compartment 46 of the valve operating motor 45; and this flow of air results in a clutch engaging operation of the motor 10. Describing this operation the power element of the motor 10 is moved to the right, Figure 1, by the clutch springs and when said springs have expanded sufficiently to bring the clutch plates just short of engagement with each other, the movement of the power element is arrested.

Explaining this arresting operation the clutch spring, by its expansion, serves to maintain a relatively low gaseous pressure, that is vacuum, within the control chamber of the motor 10. Now inasmuch as said control chamber is at all times connected to the valve chamber 24 and motor chamber 46 it follows that the gaseous pressure within said chambers is also maintained relatively low by virtue of the expansion of the clutch springs. As described above, when the clutch springs have expanded a certain amount, that is, when their vacuum creating pulling power has decreased to a certain factor, then the spring 47 automatically moves to the right, Figure 3, that is, expands, thereby lapping the three way valve 28, 30. Describing this operation of said valve the valve member 30 moves to the right until the ports 53 register with the land portion 52 of said valve member; and when this occurs the flow of air into the chamber 46 and the motor 10 is automatically cut off and the system is then in equilibrium.

In this operation the lever 90 rotates counterclockwise about the pivotal connection between the pin 122 and said lever, said pivotal connection acting as a fulcrum. As stated above, the parts of the mechanism are so constructed and arranged, particularly the strength or load of the clutch springs, the area of the diaphragm 44 and the rate of the spring 47, that the valve is lapped to arrest the movement of the power element of the clutch motor when the clutch plates are just short of contact with each other.

This operation of the motor 10 is usually described as the first stage operation thereof and it is to be particularly noted that by varying the rate of the spring 47 that the termination of the first stage operation of the motor may be varied. In other words, by varying the rate of the spring 47 there is provided means for varying the degree of separation of the clutch plates when the first stage of clutch engaging operation of the motor 10 is completed. It is also to be noted that the mechanism is preferably so constructed that this first stage of clutch engaging operation of said motor is completed before or at substantially the same time as the opening of the throttle is initiated and as a result of a relatively small degree of depression of the accelerator. This first stage operation of the motor 10 is completed very quickly and with a normal operation of the accelerator the driver may momentarily arrest the depression thereof when the resistance of the throttle return spring 145 is encountered; and this momentary arresting of the depression of the accelerator will suffice to insure a completion of the aforementioned first stage of clutch engaging operation of said motor before the throttle is opened.

To effect the step by step second stage of clutch engaging operation of the motor 10 the driver continues the depression of the accelerator thereby effecting a clockwise rotation of the bell crank lever 124 to open the throttle beyond its idling position; and this operation of the accelerator serves to again effect a leftward movement of the rod 88 and a leftward movement of the valve member 30 the lever 36 again fulcruming about its pivotal connection with the pin 43. This operation, as with the above described first stage clutch engaging operation of the motor, serves to again place the clutch motor compartment 46 and the control compartment of the clutch motor 10 in communication with the atmosphere, thereby increasing the gaseous pressure therein. The clutch springs then automatically resume their expansion to force the clutch plates into contact with each other. As before, if the driver arrests the movement of the accelerator after this resumption of movement of the valve member 30 said member again moves to its lapped position by virtue of a resumption of the expansion of the spring 47. In this valve lapping operation the direction of movement of the valve member 30 is again reversed, the lever 36 fulcruming about its connection with the pin 41. As with the above described first stage of clutch engaging operation of the mechanism the spring 47 expands to move the valve member 30 to its lapped position when the differential of pressure acting on the diaphragm 44 is reduced to a certain factor by the flow of air into the chamber 48. As with the first stage operation of the mechanism, the valve is lapped when the force exerted by the spring 47 equals the force exerted by the diaphragm 44.

The clutch plates are thus first moved just short of engagement with each other and then pressed into contact, said latter operation being effected by a succession of steps if the driver chooses to depress the accelerator by a succession of steps; and he will probably do this if he desires to effect a slipping operation of the clutch. The latter operation is, of course, necessary in effecting a very slow movement of the car such as when parking the same. The first stage operation of the mechanism, that is the operation to effect the relatively rapid movement of the clutch plates up to a point just short of engagement with each other, will, by virtue of the relatively fast movement of the valve member 30 and its degree of movement during the initial increment of movement of the accelerator, be effected very quickly. The second stage clutch engaging operation of my clutch control mechanism is effected more slowly inasmuch as the bell crank lever 124 is operated as a throttle operating lever of the first class, the levers 90 and 124 moving as a unit about the pin 126; and by virtue of this operation the degree of clutch engaging movement of the valve member 30 is relatively small compared to the degree of movement of the accelerator to effect said movement. It is also to be remembered that the first stage of clutch engaging operation of the clutch is, with a normal operation of the accelerator, completed before or at substantially the same time as the opening movement of the throttle is initiated. The adjustable stop 42 serves to control the mechanism to limit the clutch plate loading factor said factor preferably being such as to prevent a stalling of the engine.

The clutch being engaged and the accelerator partially depressed the driver then further depresses the accelerator to speed up the vehicle with the transmission established in low gear; and when the desired vehicle speed is attained the driver will then release the accelerator preparatory to establishing the transmission in a higher gear ratio setting.

There is thus provided, by the friction clutch control mechanism including our invention, power means for effecting the disengagement of the clutch when the accelerator is released to idle the engine and the transmission is established in any one of its low, reverse, or second gear settings; or when the accelerator is released to idle the engine, the vehicle is traveling below governor speed or is at rest, and the transmission is established in its high gear setting. In this clutch disengaging operation of the power means the accelerator, in its operation of the three-way valve 28, 30, cooperates with the governor in its operation of closing the switch 74 and the accelerator 118 in its operation of closing the switch 73. As to the clutch engaging operation of the power means of my invention, said operation is effected, through the intermediary of the floating lever 36, by an operation of the accelerator and an operation of the valve operating motor 45. It is also to be noted that with the clutch control mechanism disclosed herein if the driver should fail to depress the accelerator to operate the valve 28, 30 just after the transmission is established in its high gear setting, that the bleed of air into the motor 10 via the duct 66 will nevertheless insure an engagement of the clutch. This operation of the mechanism might be effected if the tranmission were placed in its high gear setting just before the vehicle started to descend a grade.

The valve mechanism disclosed herein and which constitutes our invention, insures a two stage operation of the clutch motor and a resulting smooth engagement of the clutch, with any mode of operation of the accelerator; for the operation of the leverage changing force transmitting connections and the throttle spring 145 virtually insure this two stage operation of the mechanism when the clutch is engaged as a result of a normal operation of the accelerator. The floating lever 36 interconnecting the reciprocable valve member 30 with the accelerator operated pin 41 and the power element 44 of the valve operating motor 45, provide a very simple, yet effective, means for operating the three way control valve 28, 30; the varying of the rate of the spring 47 provides a means for determining when the first stage of engagement of the clutch is completed; the particular force transmitting means interconnecting the throttle valve, the valve member 30 and the accelerator 118 insures a completion of the first stage of engagement of the clutch just as the throttle is opened or is about to be opened; and the step by step clutch engaging or disengaging operations of the power element of the clutch motor insures the desired maneuvering of the vehicle in traffic or when the vehicle is being parked.

The valve mechanism constituting our invention may be used to control mechanism other than the clutch operating motor of an automotive clutch control mechanism. For example the unit 26 might be used to control the vacuum brake mechanism of an automotive vehicle. With such a use the power and manually controlled follow up three way valve 30 of Figure 3 would control the ingress and egress of air, that is the power fluid into and from the pressure differential operated motor connected to the brakes; and the manually controlled vacuum cut in valve 57, Figure 4, would serve to either cut in or cut out the operation of the valve 30.

The valve mechanism constituting our invention is disclosed in our Patent No. 2,571,162 dated October 16, 1951, the instant application being a division thereof; and said mechanism is also disclosed in part in Harold W. Price et al. Patent No. 2,589,628 dated March 18, 1952.

It is thought that the invention and many of its attendant advantages will be understood from the foregoing description and though said invention has been illustrated in connection with but one modification thereof it will be apparent that various changes may be made in the form, construction and arrangement of the parts without departing from the spirit and scope of the invention or sacrificing all of its material advantages, the form hereinbefore described being merely a preferred embodiment.

We claim:
1. A valve unit adapted to control the ingress and egress of power fluid into and from a pressure differential operated motor comprising a casing constructed to provide a plurality of ducts including a duct adapted to be connected to a source of vacuum, a three way valve mechanism, including a movable valve member, housed within the casing, means, housed within the casing, for actuating the movable valve member said means including a floating lever member, a manually operated pin member connected to said lever member, a second pin member connected to said lever member, another pin member interconnecting the valve member and lever member and a pressure differential operated motor for actuating the second pin member; a valve within the casing for controlling the flow of power fluid through the aforementioned duct connected to a source of vacuum and thereby cut into operation or disable the valve unit as a control means, and means, also housed within the casing, for controlling the operation of the latter valve.

2. A valve unit adapted to control the ingress and egress of power fluid into and from a pressure differential operated motor comprising a casing including a plurality of ducts one of which is permanently vented to the atmosphere and another of which is adapted to be connected to a source of vacuum; a three way valve mechanism, including a movable valve member, housed within the casing; means, housed within the casing, for actuating the movable valve member including a floating lever member, a manually operated pin member connected to said lever member, a second pin member connected to said lever member, another pin member interconnecting the valve member and lever member, and a pressure differential operated motor for actuating the second pin member; a valve within the casing for controlling the flow of power fluid through the aforementioned duct connected to a source of vacuum and thereby cut into operation or disable the valve unit as a control means, said valve cooperating with the aforementioned vented duct to control the ingress and egress of power fluid into and from the valve unit; and means for controlling the operation of the latter valve.

3. A valve mechanism including a casing having a port adapted to be connected to a source of power fluid, a three way follow-up valve within the casing said valve comprising a movable valve member, a fluid transmitting connection within the casing extending between the port and the movable member; and means for operating and controlling the operation of said three way valve comprising a three way vacuum cut in valve adapted to control the flow of power fluid through the aforementioned fluid transmitting connection, and means for actuating said movable valve member including power operated means and further including means adapted to be operated or controlled by the physical effort of the operator.

4. A valve mechanism including a casing having a port adapted to be connected to a source of power fluid, a three way pressure balanced follow-up valve within the casing said valve comprising a movable valve member, a fluid transmitting connection within the casing extending between the port and the movable member; and means for operating and controlling the operation of said three way valve comprising a three way vacuum cut in valve adapted to control the flow of power fluid through the aforementioned fluid transmitting connection, and means for actuating said movable valve member including a pressure differential operated motor, and further including means adapted to be operated or controlled by the physical effort of the operator.

5. A valve mechanism adapted to be controlled by the driver of an automotive vehicle and operable to control the flow of power fluid into and from a motor said mechanism including a casing, a movable three way valve member within the casing said casing being constructed to provide a fluid transmitting passage to the valve member, a three way cut in valve member housed within the casing and serving to either open the passage to thereby connect the valve member with a source of fluid power or vent the valve member to the atomsphere; together with means, including a pressure differential operated motor and a member adapted to be actuated by the physical effort of the driver of the vehicle, for actuating the movable valve member.

6. A valve mechanism adapted to be controlled by the driver of an automotive vehicle and operable to control the flow of power fluid into and from a pressure differential operated motor said mechanism including a casing, a movable three way valve member within the casing said casing being constructed to provide a fluid transmitting passage to the valve member, a three way cut in valve member housed within the casing and serving to either open the passage to thereby connect the valve member with a source of fluid power or vent the valve member to the atmosphere; a solenoid having its armature connected to the cut in valve member together with means, including a pressure differential operated motor and a member adapted to be actuated by the physical effort of the driver of the vehicle, for actuating the movable valve member.

HAROLD W. PRICE.
EDWARD E. HUPP.

References Cited in the file of this patent

UNITED STATES PATENTS

| Number | Name | Date |
|---|---|---|
| 420,801 | Hultgren | Feb. 4, 1890 |
| 1,231,257 | Herr | June 26, 1917 |